No. 644,096. Patented Feb. 27, 1900.
J. M. RHODES.
COMBINED VIBRATING HARROW AND ROLLER.
(Application filed May 13, 1899.)
(No Model.)
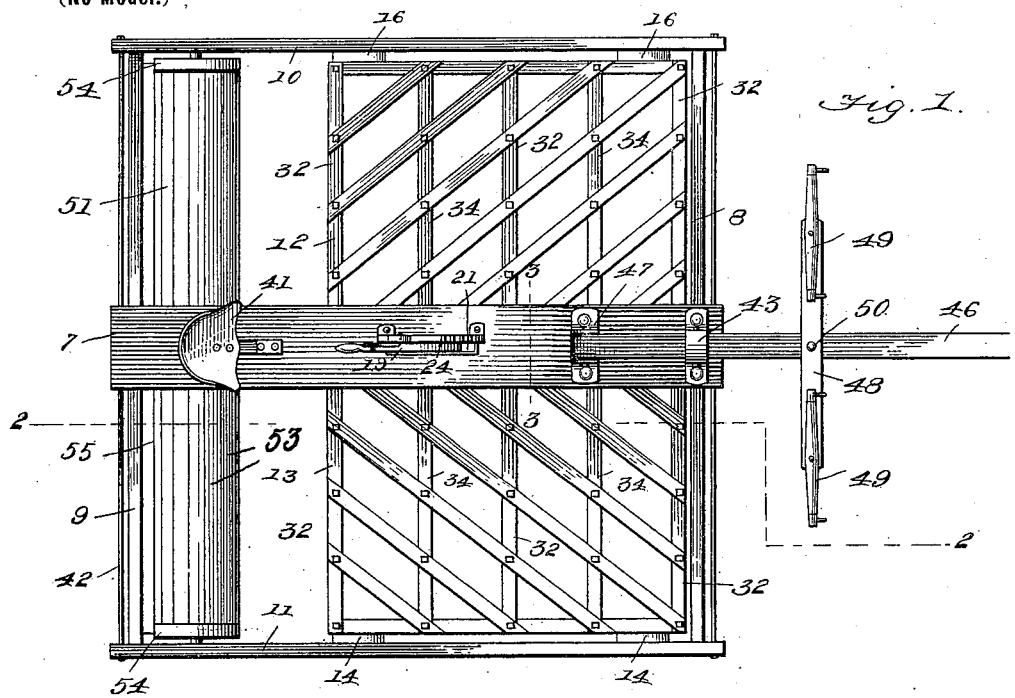
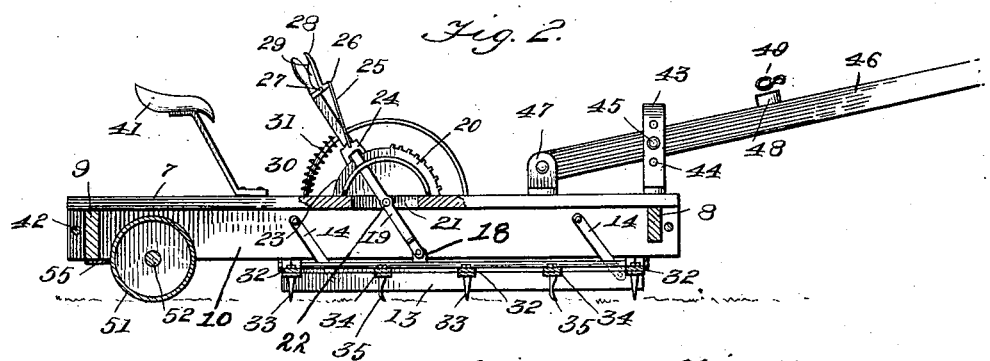
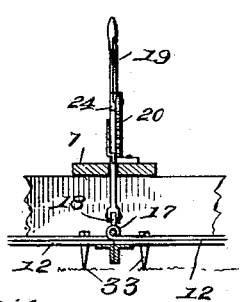
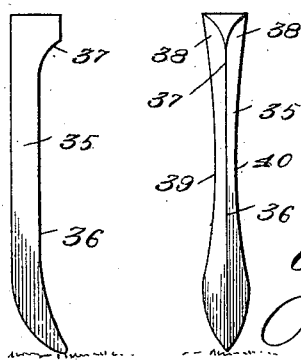
Witnesses
Inventor
J. M. Rhodes,
by
Attorneys

UNITED STATES PATENT OFFICE.

JACOB M. RHODES, OF FREDERICKTOWN, MISSOURI.

COMBINED VIBRATING HARROW AND ROLLER.

SPECIFICATION forming part of Letters Patent No. 644,096, dated February 27, 1900.

Application filed May 13, 1899. Serial No. 716,755. (No model.)

*To all whom it may concern:*

Be it known that I, JACOB M. RHODES, residing at Fredericktown, in the county of Madison and State of Missouri, have invented a new and useful Combined Vibrating Harrow and Roller, of which the following is a specification.

My invention relates to agricultural implements, and more particularly to that class of implements known as "combined harrows and rollers," the object of the invention being to provide an improved implement of this class of simple, economical, and durable construction, which in once passing over the ground will pulverize the soil, cut all small roots for a certain depth in the ground, pulverize the soil, and smoothly roll it.

With this object in view my invention consists in the improved construction, arrangement, and combination of parts hereinafter described and afterward specifically pointed out in the appended claims.

In order to enable others skilled in the art to which my invention most nearly appertains to make and use the same, I will now proceed to describe its construction and operation, reference being had to the accompanying drawings, forming part hereof, in which—

Figure 1 is a top plan view of an improved implement constructed in accordance with my invention. Fig. 2 is a vertical longitudinal sectional view on the plane indicated by the dotted line 2 2 of Fig. 1, the central beam of the frame being partly broken away. Fig. 3 is a detail sectional view on the dotted line 3 3 of Fig. 1. Figs. 4 and 5 are respectively side and front elevations of one of the knives or root-cutting teeth.

Like numerals of reference mark the same parts wherever they occur in the various figures of the drawings.

Referring to the drawings by numerals, 7 indicates a central longitudinal top beam secured upon a rectangular wooden frame comprising front beam 8, rear beam 9, and side beams 10 and 11, to which frame all the working parts are attached.

12 and 13 indicate two sections of a harrow-frame pivotally secured to the lower ends of links 14 and 16 and intermediate links pivotally connected at their upper ends to the side beams 10 and 11 and central beam 7, the two sections 12 and 13 being also hinged together on their central longitudinal sides, as at 17. To one of the inner side bars of one of the sections of the harrow-frame is pivoted a link 18, which at its opposite end is connected pivotally to the lower end of a hand-lever 19, which passes through a curved rack 20 and a slot 21 in the beam 7 and is pivoted at the center of the rack at 22. One-half of the teeth of the curved rack are omitted, as shown at 23. Above the rack a pawl 24 is slidably mounted on the hand-lever 19, which is connected by a wire bail 25 to the small arm 26 of an elbow-lever pivoted at 27 to the hand-lever, the longer arm 28 thereof extending upward in close proximity to the hand-lever and normally held away from the lever by a spring 29. At the point 30, a short distance from the pawl, the hand-lever is connected to the beam 7 by a spiral spring 31, arranged to normally maintain the pawl 24 upon the blank portion of the curved rack, but to permit the lever, and consequently the harrow-frame, to vibrate longitudinally on its supporting-links 14 and 16.

The harrow-frame sections are each provided with an uneven number (preferably five) of cross-bars, the first, third, and fifth bars (marked 32) being provided with ordinary harrow-teeth 33, and the second and fourth bars (marked 34) with knife-teeth 35, the latter being shaped as shown in Figs. 4 and 5, being triangular in cross-section, with an acute angle to the front, forming a cutting edge 36, which is curved inward from top and bottom, as at 37 38, the sides also being curved inward, as at 39 40.

An ordinary harvester-seat 41 is mounted on beam 7 in the rear of the curved rack to render the hand-lever readily accessible to the driver.

At the rear the frame is strengthened by an iron cross-bar 42, with bolt head and nuts to tighten up the frame.

At its forward end the beam 7 carries an upright casting 43, with side holes 44 to receive a pin 45. The tongue 46 is passed through casting 43 and secured on the beam 7 at 47, the elevation of the tongue being varied by raising it in the casting 43 and securing it by pin 45.

The usual doubletree 48 and singletrees 49 are connected to the tongue by coupling-bolt 50 in the usual manner.

In the rear portion of the frame two rollers 51 are journaled on a single shaft 52, said rollers being composed of wooden staves 53, held by end wheels 54, of metal, flush with the outer surface of the staves. A scraper 55 bears upon the rear surfaces of the rollers and serves to clear off clay or other matter which sticks to them.

The foregoing will give a clear understanding of the construction of the invention, and its operation may be described as follows: The implement having been brought to the field to be worked, the hand-lever is adjusted to the position indicated in Fig. 2, the tongue having been properly elevated by the means before described, and the team is started. The ordinary harrow-teeth 33 pulverize the soil in the usual manner, while the knife-teeth cut small roots below the surface and the rollers smooth the surface and mash any clods which the harrow may pass over, said rollers being kept clear and clean by the scraper. During the operation the harrow will vibrate forward and backward on its supporting-links, the spring 31 permitting it to give or yield backward when extra obstructions are encountered and forcing it forward to its normal position when such obstructions are passed. When turning, if desired, or when it is desired for any purpose to raise the harrow, the lever 19 is drawn forward, the pawl 24 being first raised by means of the elbow-lever, which movement of the hand-lever will swing the harrow backward on links 14 15 16, raising it off the ground, where it may be held as long as desired by releasing the elbow-lever and permitting the pawl to engage the teeth of the curved rack.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. The combination with the implement-frame, of the harrow, the links suspending the harrow, the hand-lever pivoted through the frame and connected below it to the harrow, and the spring connecting the hand-lever with the frame, substantially as described.

2. The combination with the implement-frame, of the harrow, the links suspending the harrow below the frame, the curved rack with part of its teeth omitted, the hand-lever pivoted in through slot in the frame at the center of the curved rack, the pawl slidably fixed on the hand-lever above the rack, operating devices for the pawl, and the spring connecting the hand-lever to the frame, substantially as described.

3. The combination with the implement-frame of the yielding vibratory harrow, supporting-spring, and means for locking it against vibration, substantially as described.

4. The combination with the implement-frame and the yielding vibratory harrow, of the hand-lever, the rack-and-pawl mechanism, the roller journaled in the frame and the scraper, substantially as described.

5. The combination with the implement-frame of the yielding vibratory harrow provided with alternate rows of ordinary harrow-teeth and root-cutting teeth, substantially as described.

6. The combination with the implement-frame consisting of front, rear, side and central beams, of the harrow in two sections hinged together below the central beam, links pivotally suspending the harrow-frame from the side and central beams, a hollow curved rack mounted over a slot in the central beam, and having part of its teeth omitted, a hand-lever projecting through said slot and pivoted at the center of the curved rack, a sliding pawl on the lever straddling the curved rack, and a spring connecting the lever with the central beam, substantially as described.

JACOB M. RHODES.

Witnesses:
A. E. THOMPSON,
A. C. BROOKES.